Patented Oct. 12, 1954

2,691,635

UNITED STATES PATENT OFFICE 2,691,635

PROCESS FOR THE MANUFACTURE OF DIALKYL THIONOCARBAMATES

Guy H. Harris, Concord, and Bryant C. Fischback, Walnut Creek, Calif., assignors to The Dow Chemical Company, Midland, Mich., a corporation of Delaware No Drawing. Application May 20, 1953, Serial No. 356,321

13 Claims. (Cl. 252—61)

This invention relates to dialkyl thionocarbamates and to processes for preparing the same.

The thionocarbamic esters of this invention are a class of compounds characterized by having the general formula:

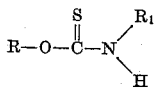

wherein R and $R_1$ are alkyl groups. Certain of such esters when in the pure state have been used in the recovery of ores and minerals by flotation methods.

Former methods for preparing these esters used pure alkyl xanthates and amines as starting materials. Such materials were expensive and difficult to prepare. In other methods it was necessary to isolate and to purify the intermediates to obtain satisfactory yields of the esters. Such operations are time consuming and raise the cost of the esters.

An inexpensive process for the preparation of such esters would be highly desirable.

Accordingly the provision of such a process for the preparation of dialkyl carbamic esters is the principal object of this invention.

It is a further object to provide a process for the preparation of such esters which does not require the isolation of the intermediates.

A still further object is to provide new products capable of being used in flotation methods for recovering ores and minerals.

The above and related objects are accomplished by a process which may be represented by the following typical equations:

(1) 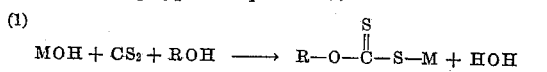

(2) 

(3) 

wherein M is any alkali metal and R and R' represent any alkyl group containing from 1 to 6 carbon atoms.

Certain side reactions may take place simultaneously with the above-mentioned reactions. These side reactions use up large amounts of the starting materials with a consequent lowering of the yield of the desired thionocarbamic esters. The control of the desired reactions represented by Equations 1 to 3 is therefore very important, so that the amounts of the by-products produced will be minimized.

The alkali metal hydroxide used in Equation 1 may be either solid or a concentrated aqueous solution. The order of addition of the MOH and $CS_2$ to the ROH in Equation 1 is unimportant.

Alkyl halides other than methyl chloride may be used in Equation 2 but the resulting mercaptans formed in Equation 3 are more difficult to separate from the final reaction mixture.

The reaction temperatures are important. In Equation 1 the temperature should be between 15° to 70° C. preferably from 35° to 50° C. Higher temperatures favor the formation of sodium trithiocarbonate instead of the desired sodium alkyl xanthate of Equation 1. The temperature for Equation 2 should be between 25° to 70° C., preferably from 40° to 55° C. The temperature in this step must be high enough to have a rapid reaction but as low as possible to minimize the loss of alkyl chloride from the reaction through distillation. The temperature for the step represented by Equation 3 should be low enough to insure retention of the amine and mercaptan in the reactor. Temperatures from 15° to 50° C. have been found to be satisfactory for this purpose.

It is preferred to add all of the ingredients in each step as quickly as possible. In most instances, it is necessary to cool the reaction mixture during the addition to keep within the aforementioned temperature ranges for each step. After each addition is complete, the mixture should be allowed to react at least a half hour.

Although the ratio of the ingredients is not critical, the preferred ratios are one mole $CS_2$, 1.135 moles MOH, 4.0 moles alcohol, 1.01 moles alkyl halide, and 1.01 moles of amine. Thus, the carbon disulfide is the limiting factor in the amounts used. 1.135 moles MOH is the least amount necessary to use up all of the $CS_2$. 4.0 moles of alcohol is preferred to provide better fluidity to the mixture, and to cause the reaction to follow Equation 1 rather than to form a trithiocarbonate. Larger quantities may be used but the size of the reactor is the limiting factor. Less than the preferred amount of alkyl halide lowers the yields of the thionocarbamate, while greater amounts form amine hydrochlorides. Less than the preferred amount of amine also lowers the yield of the dialkyl thioncarbamates. Greater amounts may be used but no benefits are achieved in such cases and the cost of the esters is greatly increased.

All of the steps comprising the method of the invention may be carried out in the same vessel. The intermediates need not be isolated and purified after each step and, in fact, it is preferred not to isolate these intermediates, since such operations are laborious and time-consuming and no additional beneficial results are obtained. For example, it is possible to separate the brine from the mixture after step (2). However, it is preferred to steam distill the mixture following step (3) which removes the mercaptan, alcohol, and other low boiling constituents, leaving only brine and product in the pot. After steam distilling, the organic and aqueous layers may be separated and the organic layer dried by any convenient means, such as drying over a desiccant.

The dried organic product resulting from the process of this invention consists generally of from 50 to 90% of the alkyl thionocarbamic ester, the balance consisting principally of alkyl dithiocarbamate, dialkyl xanthate, and dialkyl trithiocarbonate.

The process of the invention will be more apparent from the following example which is intended to be illustrative of the invention.

EXAMPLE

Into a 3 necked flask equipped with a dropping funnel and water-jacketed condenser was charged 12 moles of isopropyl alcohol and 4 moles of sodium hydroxide. Four moles of carbon disulfide were added to the mixture and the reaction was allowed to proceed for one-half hour with the temperature kept under 60° C. The condenser was then replaced with a Dry Ice condenser and a gas inlet tube below the surface of the liquid was substituted for the dropping funnel. Four moles of methyl chloride were introduced and the reaction allowed to proceed for one hour after which 4 moles of a 70 per cent aqueous solution of ethyl amine was added. The mixture was then fractionally distilled to remove the mercaptan, following which 300 cc. water was added and the organic and water layers separated. The isopropyl alcohol was removed and the product contained 88.2 per cent of isopropyl ethylthionocarbamate. The balance of the crude product consisted principally of methyl ethyldithiocarbamate, methyl isopropylxanthate, and dimethyl trithiocarbonate.

By a similar process, ethyl ethylthionocarbamate, isopropyl n-butylthionocarbamate, 2-butyl isopropyl thionocarbamate and 1,3-dimethylbutyl hexylthionocarbamate were prepared. It should be apparent that in each case the alcohol and amine employed corresponded to the appropriate alkyl groups in the final product.

The crude reaction product, containing 50 to 90 per cent dialkylthionocarbamate is surprisingly more effective as a flotation agent than is pure dialkyl-thionocarbamate made by prior and more cumbersome procedures. This is illustrated in the following table, which represents results obtained in a standard flotation cell, using a commercial copper-iron ore under standard test conditions.

Table

| Flatotation Agent | Quantity (lbs./Ton Ore) | Recovery (Percent) | | Selectivity Index Cu/Fe |
|---|---|---|---|---|
| | | Cu | Fe | |
| Crude Ethyl ethyl thionocarbamate | 0.031 | 96.5 | 27.4 | 8.5 |
| Crude Isopropyl ethyl thionocarbamate | 0.029 | 96.6 | 32.0 | 7.8 |
| Crude Isopropyl n-butyl thionocarbamate | 0.026 | 96.8 | 33.3 | 7.8 |
| Crude 2-butyl isopropyl thionocarbamate | 0.029 | 96.9 | 30.3 | 8.5 |
| Pure Isopropyl ethyl thionocarbamate | 0.030 | 96.7 | 33.4 | 7.7 |
| Sodium Isopropyl xanthate (standard) | 0.030 | 96.4 | 33.8 | 7.3 |

We claim:
1. A process for the production of alkyl thionocarbamic esters comprising the steps (1) reacting, at a temperature of from 15° to 70° C. for at least ½ hour, an alkali metal hydroxide, carbon disulfide, and an aliphatic alcohol containing from 1 to 6 carbon atoms; (2) treating the resultant mixture with an alkyl halide for at least ½ hour at a temperature of from 25° to 70° C.; (3) introducing an alkyl amine containing from 1 to 6 carbon atoms into the mixture at a temperature of from 15° to 50° C.; (4) removing the formed mercaptan and remaining alcohol; (5) separating the organic and aqueous phases; and (6) drying the organic layer.

2. The process claimed in claim 1 wherein step (4) is achieved by steam distilling the mixture from step (3).

3. The process claimed in claim 1 wherein the alcohol used is isopropyl alcohol.

4. Process of claim 1 wherein the alcohol used is ethyl alcohol.

5. Process of claim 1 wherein amine is ethyl amine.

6. Process of claim 1 wherein amine is methyl amine.

7. Process of claim 1 wherein amine is isopropyl amine.

8. A composition of matter comprising from 50 per cent to 90 per cent of dialkyl thionocarbamate, in which the alkyl groups contain from 1 to 6 carbon atoms; the balance of said composition consisting principally of dialkyl dithiocarbamate, dialkylxanthate, and dialkyl trithiocarbonate.

9. A composition of matter comprising from 50 per cent to 90 per cent of isopropyl ethylthionocarbamate, the balance of said composition consisting principally of methyl ethyldithiocarbamate, methyl isopropylxanthate and dimethyl trithiocarbonate.

10. A composition of matter comprising from 50 per cent to 90 per cent isopropyl methyl thionocarbamate, the balance of said composition consisting principally of methyl methyldithiocarbamate, methyl isopropylxanthate, and dimethyl trithiocarbonate.

11. A composition of matter comprising from 50 per cent to 90 per cent isopropyl isopropylthionocarbamate, the balance of said composition consisting principally of methyl isopropyldithiocarbamate, methyl isopropylxanthate, and dimethyltrithiocarbonate.

12. A composition of matter comprising from 50 per cent to 90 percent ethyl ethylthionocarbamate, the balance of said composition consisting principally of methyl ethyldithiocarbamate, methyl ethylxanthate, and dimethyl trithiocarbonate.

13. A composition of matter comprising from 50 per cent to 90 per cent ethyl isopropylthionocarbamate, the balance of said composition consisting principally of methyl isopropyldithiocarbamate, methyl ethylxanthate, and dimethyl trithiocarbonate.

References Cited in the file of this patent

UNITED STATES PATENTS

| Number | Name | Date |
|---|---|---|
| 1,819,113 | Perkins | Aug. 18, 1931 |
| 1,943,758 | Douglass | Jan. 16, 1934 |
| 1,973,273 | Barker | Sept. 11, 1934 |
| 2,469,368 | Carvajal | May 10, 1949 |